E. WORTHINGTON.
TREE PROP.
APPLICATION FILED OCT. 20, 1911.
1,021,650.
Patented Mar. 26, 1912.
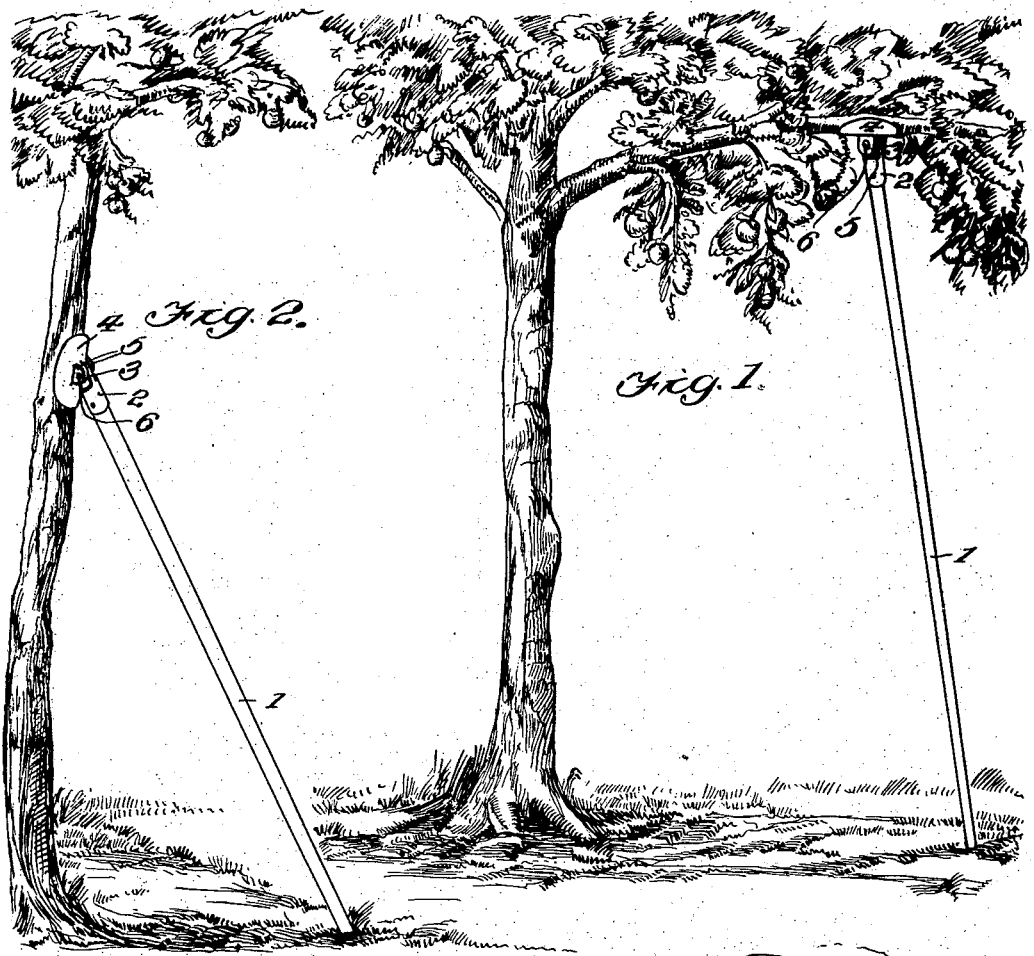
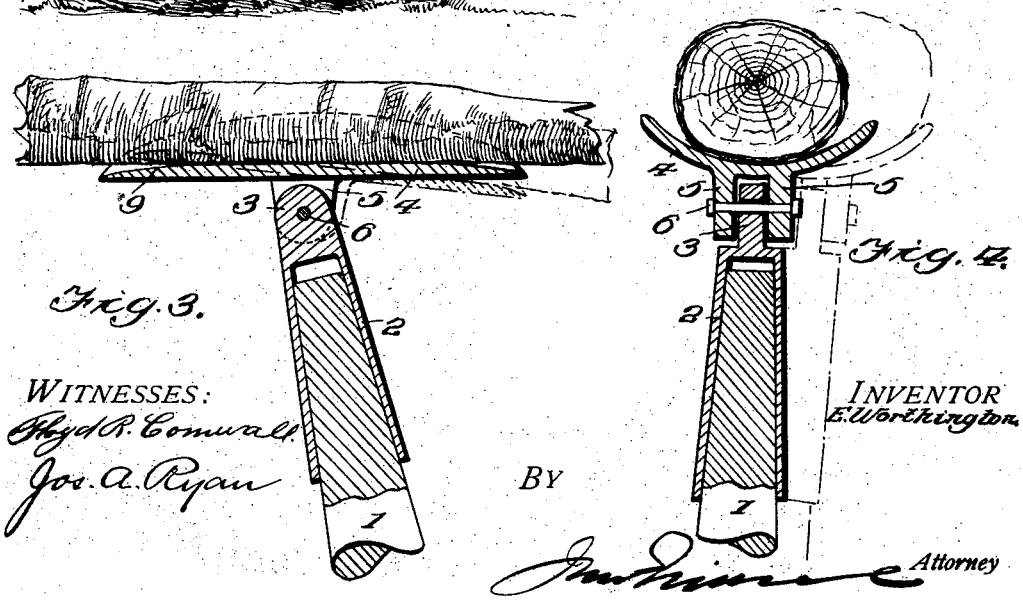
WITNESSES:
INVENTOR
E. Worthington
BY
Attorney

UNITED STATES PATENT OFFICE.

EDGAR WORTHINGTON, OF HAGERSTOWN, MARYLAND.

TREE-PROP.

1,021,650.　　　　Specification of Letters Patent.　　Patented Mar. 26, 1912.

Application filed October 20, 1911. Serial No. 655,784.

*To all whom it may concern:*

Be it known that I, EDGAR WORTHINGTON, citizen of the United States, residing at Hagerstown, in the county of Washington and State of Maryland, have invented certain new and useful Improvements in Tree-Props; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in props for supporting limbs of trees.

Props for tree limbs have been employed heretofore, but in each instance known to me they have been so constructed that as the limb is swayed to and fro the friction incident to such movement soon wears off the bark, and in time the limb dies.

According to my present invention, I provide a prop so constructed that as the limb swings in any direction, friction is entirely eliminated; hence avoiding the danger of marring the tree, or in any manner dangerously affecting the life of the part supported.

The invention also relates to the specific details of construction and arrangement of parts which will be hereinafter described and particularly pointed out in the claims.

In the drawings: Figure 1 is a view illustrating the invention as used to support the limb of a tree. Fig. 2 is a view illustrating the invention when used to brace the trunk of a tree. Fig. 3 is a detail longitudinal section of the upper portion of my improved prop. Fig. 4 is a transverse section of the same, the dotted lines showing the position of the parts when the limb sways laterally.

The numeral 1, indicates a pole, the lower end of which is supported on the ground when the prop is in use. On the upper end of the pole is a ferrule, or cap member 2, provided at its free end with a reduced portion or perforated ear 3.

The numeral 4 designates a preferably elongated concave seat, provided with a pair of perforated depending ears 5, which embrace the ear 3. A pin 6, passes through the perforations in the ears 3 and 5, to form a pivotal connection between the cap and the concave seat.

In use, the concave seat is slipped under a fruit laden limb, the concave elongated portion affording a substantial bearing, and the lower end of the pole rests on the ground, and by reason of the pivotal connection, the prop can be conveniently adapted to suit any angular disposition the limb may assume. The prop having been applied for use, for instance as shown in Fig. 1, it is evident that should the limb sway vertically, the pivotal connection between the cap and the pole will permit of a rocking movement between these parts, hence the bark of the limb will not be marred; but to off set any possibility of an extreme movement of the limb causing a movement between the latter and the concave seat, the upper surface of the latter is slightly convex, as shown at 9, in Fig. 3. All the vertical movement between the tree limb and the prop occurs at the pivotal connection in order to remove the liability of injuring the bark. Should the limb of the tree sway laterally, the prop as a whole will swing with said limb without in any wise creating movement between the bark and the surface of the concave seat, as shown in dotted lines in Fig. 4. By this construction, the prop will accommodate all the various movements of the limb of a tree, without in the least marring or destroying the bark, which is essential.

Experience has demonstrated that where the bark of a fruit laden limb of a tree is destroyed, as with props now in use, it is but a short time before the life of the limb becomes weakened, and its bearing properties destroyed, but by arranging the prop as an effectual support, and without destroying the bark, the life of the limb is prolonged, and it will continue to bear fruit.

The invention is not limited in its use as a support for overhanging limbs, but is equally well adapted for bracing the trunks of young trees, as shown in Fig. 2. It frequently occurs that a young tree will tend to grow up at an angle, or form a crook. By placing the concave seat against the trunk, and the end of the pole on the ground, and applying pressure, so as to force the trunk of the tree in a vertical line, said trunk will in time grow and assume a vertical position.

The invention is extremely simple in construction, is effective in operation, and the result accomplished is of great practical advantage, as a large number of fruit laden limbs can be saved from destruction.

The elongated concave seat which receives the limb, is adjustable, and acts as a support without any possible chance of rubbing or breaking the bark, when a rigid prop is employed and acts as a dead center for the limb, and when the latter sways down there is nothing to relieve the strain, hence the limb or the bark will break. But by providing the prop with a pivot such as disclosed, there is no dead center, hence the limb is free to move and the strain is equalized.

What I claim is:

1. A prop for a tree having a seat and a hinge joint, adapted to permit said seat and a limb supported therein to sway in any direction, one end of said prop being supported on the ground.

2. A prop for a tree comprising a pole adapted to rest on the ground, a seat for a limb of a tree, and a pivotal connection between said seat and the pole, said pivotal connection permitting of a limb to sway in a vertical plane, whereby to avoid the surface of the seat rubbing the bark of the limb.

3. A prop for a tree comprising a pole, a concave seat for a limb of a tree, the surface of the seat being convex in direction of a limb supported by said seat, and a pivotal connection between the seat and the pole, said pivotal connection permitting of a limb to sway vertically.

4. A prop comprising a concave seat to support the limb of a tree, a pole and a pivotal connection between the concave seat and the pole, the pole adapted to be supported on the ground whereby the pivotal connection will permit a limb of a tree to sway vertically and the limb may laterally sway the seat and pole, the lower end of the pole bearing on the ground acting as fulcrum for said lateral swaying movement.

5. A tree prop adapted to be supported on the ground comprising a pole, a cap member fitted on said pole and formed with a perforation, a concave elongated seat having depending perforated ears, and a pin passing through the perforations to form a pivotal connection, whereby the pivotal connection and the prop when the latter is supported on the ground will permit the limb to sway in a vertical plane, whereby the prop, seat and limb may sway laterally and avoid rubbing the bark on the limb.

In testimony whereof I have signed my name to this specification in the presence of two subscribing witnesses.

EDGAR WORTHINGTON.

Witnesses:
F. WILBUR BRIDGES,
CHAS. C. EASTON.

---

Copies of this patent may be obtained for five cents each, by addressing the "Commissioner of Patents, Washington, D. C."